US010488669B2

(12) United States Patent
Kuriki et al.

(10) Patent No.: US 10,488,669 B2
(45) Date of Patent: Nov. 26, 2019

(54) HEAD-MOUNTED DISPLAY

(71) Applicant: HONDA MOTOR CO., LTD., Tokyo (JP)

(72) Inventors: Daisuke Kuriki, Wako (JP); Hajime Ito, Wako (JP); Tomoko Ino, Wako (JP)

(73) Assignee: HONDA MOTOR CO., Ltd., Tokyo (JP)

( * ) Notice: Subject to any disclaimer, the term of this patent is extended or adjusted under 35 U.S.C. 154(b) by 157 days.

(21) Appl. No.: 15/908,032

(22) Filed: Feb. 28, 2018

(65) Prior Publication Data

US 2018/0275413 A1    Sep. 27, 2018

(30) Foreign Application Priority Data

Mar. 27, 2017    (JP) .................................. 2017-061766

(51) Int. Cl.
| | |
|---|---|
| G02B 27/01 | (2006.01) |
| A42B 3/04 | (2006.01) |
| H04N 5/225 | (2006.01) |
| A42B 3/30 | (2006.01) |

(52) U.S. Cl.
CPC .......... *G02B 27/0176* (2013.01); *A42B 3/042* (2013.01); *A42B 3/30* (2013.01); *H04N 5/2251* (2013.01); *G02B 27/0172* (2013.01)

(58) Field of Classification Search
CPC ..................... G02B 27/0176; G02B 27/0172
See application file for complete search history.

(56) References Cited

U.S. PATENT DOCUMENTS

| | | | | |
|---|---|---|---|---|
| 10,401,913 | B2* | 9/2019 | Mendoza | G02B 27/0093 |
| 2013/0083003 | A1* | 4/2013 | Perez | G06F 3/005 |
| | | | | 345/419 |
| 2013/0278631 | A1* | 10/2013 | Border | G02B 27/017 |
| | | | | 345/633 |
| 2016/0187662 | A1* | 6/2016 | Sato | G02B 27/017 |
| | | | | 345/8 |
| 2016/0238842 | A1* | 8/2016 | Sendai | G02B 27/0176 |
| 2017/0090514 | A1* | 3/2017 | Byun | G06F 1/166 |
| 2018/0031847 | A1* | 2/2018 | Tatsuta | G02B 27/0176 |
| 2018/0177403 | A1* | 6/2018 | Kim-Whitty | A61B 6/5229 |

FOREIGN PATENT DOCUMENTS

| | | |
|---|---|---|
| JP | 2002-072130 | 3/2002 |
| JP | 2009-092809 | 4/2009 |

OTHER PUBLICATIONS

European Search Report dated Aug. 28, 2018, 5 pages.

\* cited by examiner

*Primary Examiner* — Ricardo Osorio
(74) *Attorney, Agent, or Firm* — Rankin, Hill & Clark LLP

(57) ABSTRACT

To provide a head-mounted display that can be mounted on a helmet which can take various shapes, that permits adjustments of a mounting position with respect to the helmet to any desired position, that facilitates mounting and removal, and that permits disposition of a display at any position. A head-mounted display includes a mounting portion that can be removed from a helmet, a connector that is connected with the mounting portion and that allows a position to be freely adjusted. A display is disposed at a distal end of the connector, the display includes a positioner, and a positioned portion at which the positioner is positioned is fixed to the helmet such that a position can be freely adjusted.

7 Claims, 3 Drawing Sheets

HEAD-MOUNTED DISPLAY

INCORPORATION BY REFERENCE

The present application claims priority under 35 U.S.C. § 119 to Japanese Patent Application No. 2017-061766 filed on Mar. 27, 2017. The content of the application is incorporated herein by reference in its entirety.

TECHNICAL FIELD

The present invention relates to a head-mounted display that can be mounted on, and removed from, a helmet.

BACKGROUND ART

Patent Documents 1 and 2 each disclose a structure for mounting, on a helmet of an occupant of a saddle riding vehicle, a head-mounted display including a display and a clip integrated therewith. The structures are known to readily change a mounting position of the head-mounted display.

PRIOR ART

Patent Documents

[Patent Document 1]
Japanese Patent Laid-Open No. 2009-092809
[Patent Document 2]
Japanese Patent Laid-Open No. 2002-072130

SUMMARY OF THE INVENTION

Problem to be Solved by the Invention

With the arrangement disclosed in each of Patent Documents 1 and 2, however, the clip is directly mounted on the head-mounted display and thus the position of the head-mounted display can be adjusted only by changing the mounting position of the clip. Physique (e.g., size of a face and position of eyes) varies from one occupant to another and a range in which display contents of the head-mounted display can be recognized in a field of view is extremely narrow. While the saddle riding vehicle is travelling, in particular, a great distance over which a line of sight is moved to the range is not desirable from a safety viewpoint.

The present invention has been made in view of the foregoing situation and it is an object of the present invention to provide a head-mounted display that can be mounted on a helmet which can take various shapes, that permits adjustments of a mounting position with respect to a helmet to any desired position, that facilitates mounting and removal, and that permits disposition of a display at any position.

Means for Solving the Problem

To achieve the foregoing object, an aspect of the present invention provides a head-mounted display including a mounting portion (4) that can be removed from a helmet (100), a connector (3) that is connected with the mounting portion (4) and that allows a position to be freely adjusted, a display (2) disposed at a distal end of the connector (3), a positioner (5) included in the display (2), a positioned portion (6) at which the positioner (5) is positioned being fixed to the helmet (100) such that a position can be freely adjusted.

In the aspect of the present invention, preferably, the positioned portion (6) is inserted and fixed in position between a helmet shell (102) and an inner part (103).

In the aspect of the present invention, preferably, the positioned portion (6) includes a fixing portion (31) having a diameter enlarged inside the helmet (100).

In the aspect of the present invention, preferably, the positioner (5) is configured to be mountable on, and removable from, the positioned portion (6).

In the aspect of the present invention, preferably, the display (2) includes a flat plate-shaped liquid crystal display (11).

In the aspect of the present invention, preferably, the display (2) is provided so as to be disposed inside a shield (104) of the helmet (100).

In the aspect of the present invention, preferably, the mounting portion (4) is removably disposed at the helmet shell (102) of the helmet (100).

Effects of the Invention

The head-mounted display in the aspect of the present invention includes a mounting portion that can be removed from a helmet, a connector that is connected with the mounting portion and that allows a position to be freely adjusted. A display is disposed at a distal end of the connector, the display includes a positioner, and a positioned portion at which the positioner is positioned is fixed to the helmet such that a position can be freely adjusted. Through the foregoing configuration, the head-mounted display can be mounted on a helmet that can take various shapes. The position of the head-mounted display can be freely adjusted with respect to a main unit of the helmet. Additionally, the head-mounted display facilitates mounting and removal. Additionally, the display can be disposed at any position. Thus, the display can be disposed at an optimum position within a field of view regardless of differences in physique (e.g., size and shape of a face of an occupant) and in an operating position for operating a vehicle. Removal of the helmet can also be easily performed by displacing the display outwardly. Additionally, the positioner and the positioned portion prevent the display from being oscillated by excessive vibrations (due to, for example, road conditions, weather, and when the occupant shakes his or her head). The display can thus be made more easily viewable. Because the display is positioned at the helmet main unit instead of a shield, the display only can be left to stay within the field of view even when the shield is raised.

In the aspect of the present invention, the positioned portion may be inserted and fixed in position between the helmet shell and the inner part. Through the foregoing configuration, the positioned portion can be fixed to the helmet main unit using a simple structure.

In the aspect of the present invention, the positioned portion may include the fixing portion having a diameter enlarged inside the helmet. Through the foregoing configuration, a frictional resistance surface between the helmet shell and the inner part can be increased, while having a compactly built protrusion that protrudes to the outside of the helmet.

In the aspect of the present invention, the positioner is configured to be mountable on, and removable from, the positioned portion. Through the foregoing configuration, when the liquid crystal display is not necessary, the display can be easily displaced to a position outside the field of view. Moreover, by positioning the display in the helmet main unit instead of the shield, the display only can be displaced to a position outside the field of view with the shield in a lowered position.

Additionally, in the aspect of the present invention, the display may include a flat plate-shaped liquid crystal display. Through the foregoing configuration, a displayed image is not curved and is thus easily recognizable.

In the aspect of the present invention, the display may be provided so as to be disposed inside the shield of the helmet. Through the foregoing configuration, the display can be protected by the shield.

In the aspect of the present invention, the mounting portion may be removably disposed at the helmet shell of the helmet. This configuration facilitates removal and wearing of the helmet.

MODE FOR CARRYING OUT THE INVENTION

Figure 1:
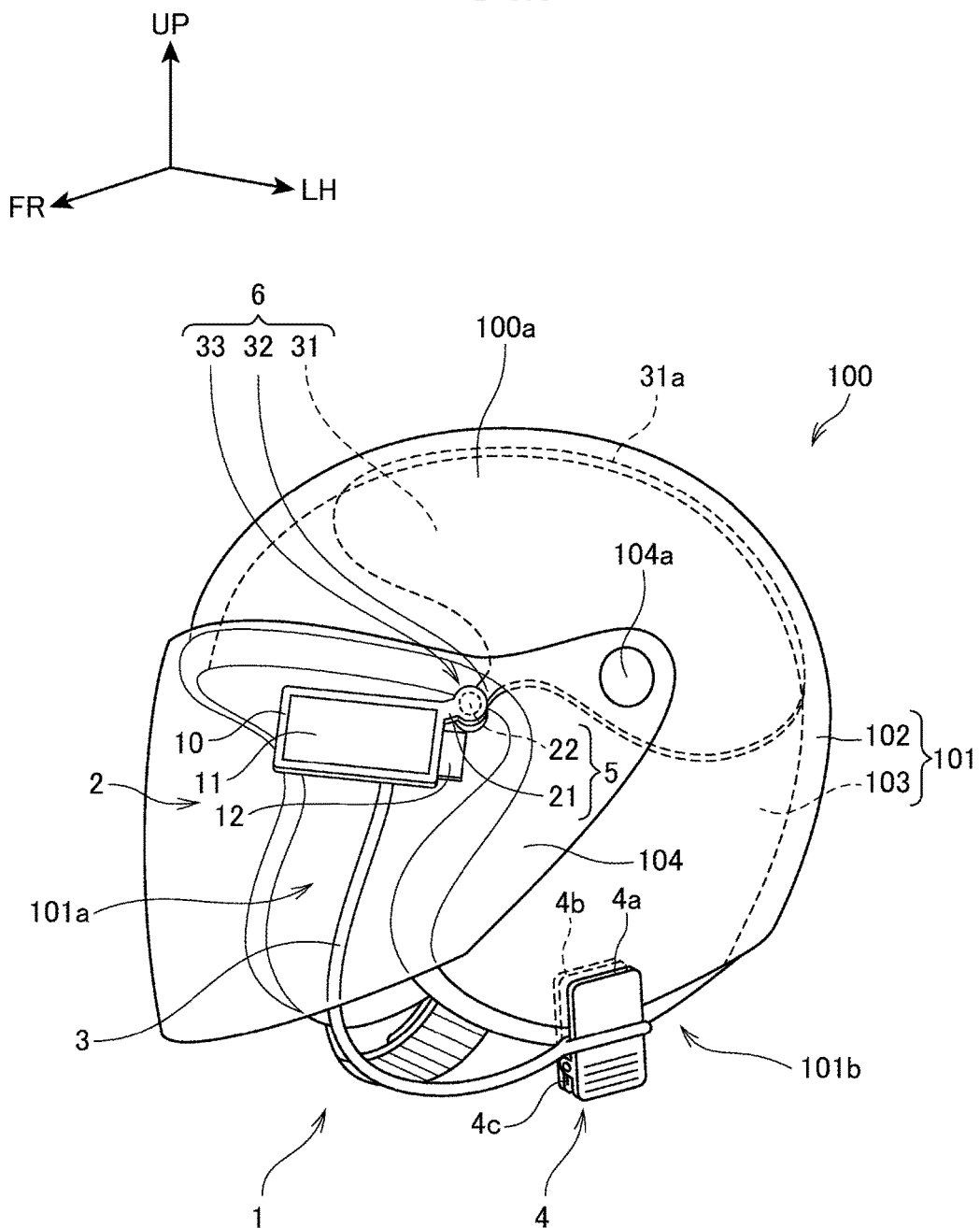
FIG. 1 is a view illustrating a head-mounted display according to an embodiment of the present invention mounted on a helmet.

A specific embodiment to which the present invention is applied will be described below with reference to the accompanying drawings. Throughout the descriptions given hereunder, expressions indicating directions including front and rear, right and left, and up and down are identical to directions with reference to a user unless otherwise specified. In the drawings, an arrow FR indicates a direction anterior to the user, an arrow UP indicates a direction superior to the user, and an arrow LH indicates a direction toward the left of the user.

FIG. 1 is a perspective view of a head-mounted display 1 according to an embodiment of the present invention mounted on a helmet 100.

The head-mounted display 1 is configured so as to be mounted on the helmet 100 of an occupant of, for example, a saddle riding vehicle. The head-mounted display 1 on the helmet 100 is worn together with the helmet 100 on a head.

The head-mounted display 1 includes a monitor (display) 2, a flexible hose (connector) 3, and a clip (mounting portion) 4. The monitor 2 displays information. The flexible hose 3 supports the monitor 2. The clip 4 mounts the monitor 2 on the helmet 100 via the flexible hose 3. The flexible hose 3 can maintain posture at a flexed position.

Figure 2A:
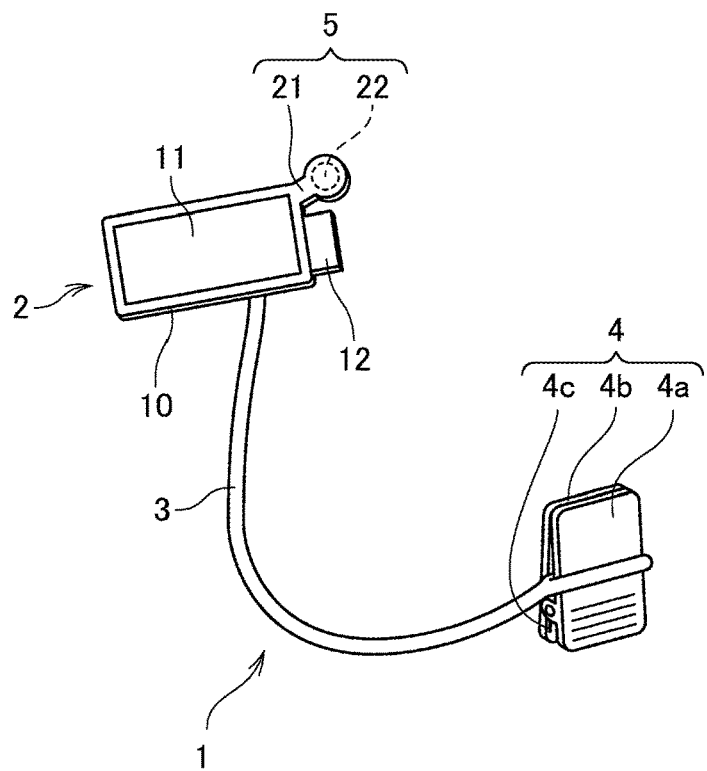
FIGS. 2A and 2B are views illustrating the head-mounted display according to the embodiment of the present invention, FIG. 2A illustrating a main unit of the head-mounted display and FIG. 2B illustrating a positioning sheet.

Reference is made to FIG. 2A. The clip 4 includes a pair of clip plates 4a and 4b. The flexible hose 3 has a first end connected with the clip plate 4a. A torsion spring 4c is disposed between the clip plates 4a and 4b.

The helmet 100 includes a helmet main unit 101. The helmet main unit 101 includes a helmet shell 102 and an inner part 103 as a cushion. The clip 4 is mounted at a neck base 101b of the helmet main unit 101 such that the clip plate 4b is inserted between the helmet shell 102 and the inner part 103. The clip 4 can be mounted at any position of the neck base 101b.

The monitor 2 is mounted on a second end of the flexible hose 3. The monitor 2 includes a frame 10 and a transmission-type liquid crystal display (liquid crystal display) 11.

The liquid crystal display 11 is held in the frame 10. The liquid crystal display 11 is formed into a flat plate shape (or flat sheet shape). The liquid crystal display 11 having the flat sheet shape displays an easily visible image that is not curved. The liquid crystal display 11, while displaying an information image generated by a processor 12, is configured such that a real image anterior to the liquid crystal display 11 can be transmitted toward a field of view. The processor 12 includes an internal battery (not depicted), a communication unit (not depicted) capable of communicating with an external information processor (not depicted), and a processing unit (not depicted). On the basis of communication with the external information processor, the processor 12 controls the liquid crystal display 11 to thereby cause the liquid crystal display 11 to display information images including navigation, traveling speed, traveling spot, and the like.

Figure 2B:
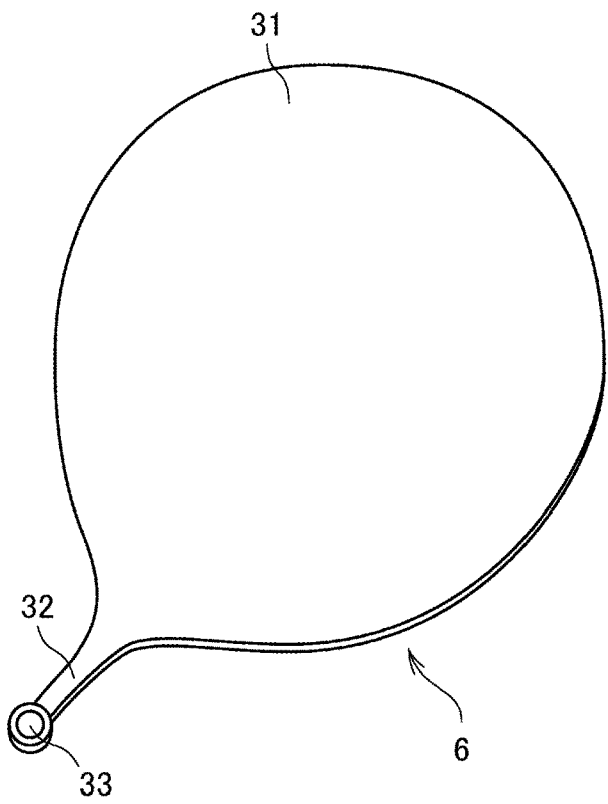
Figure 3:
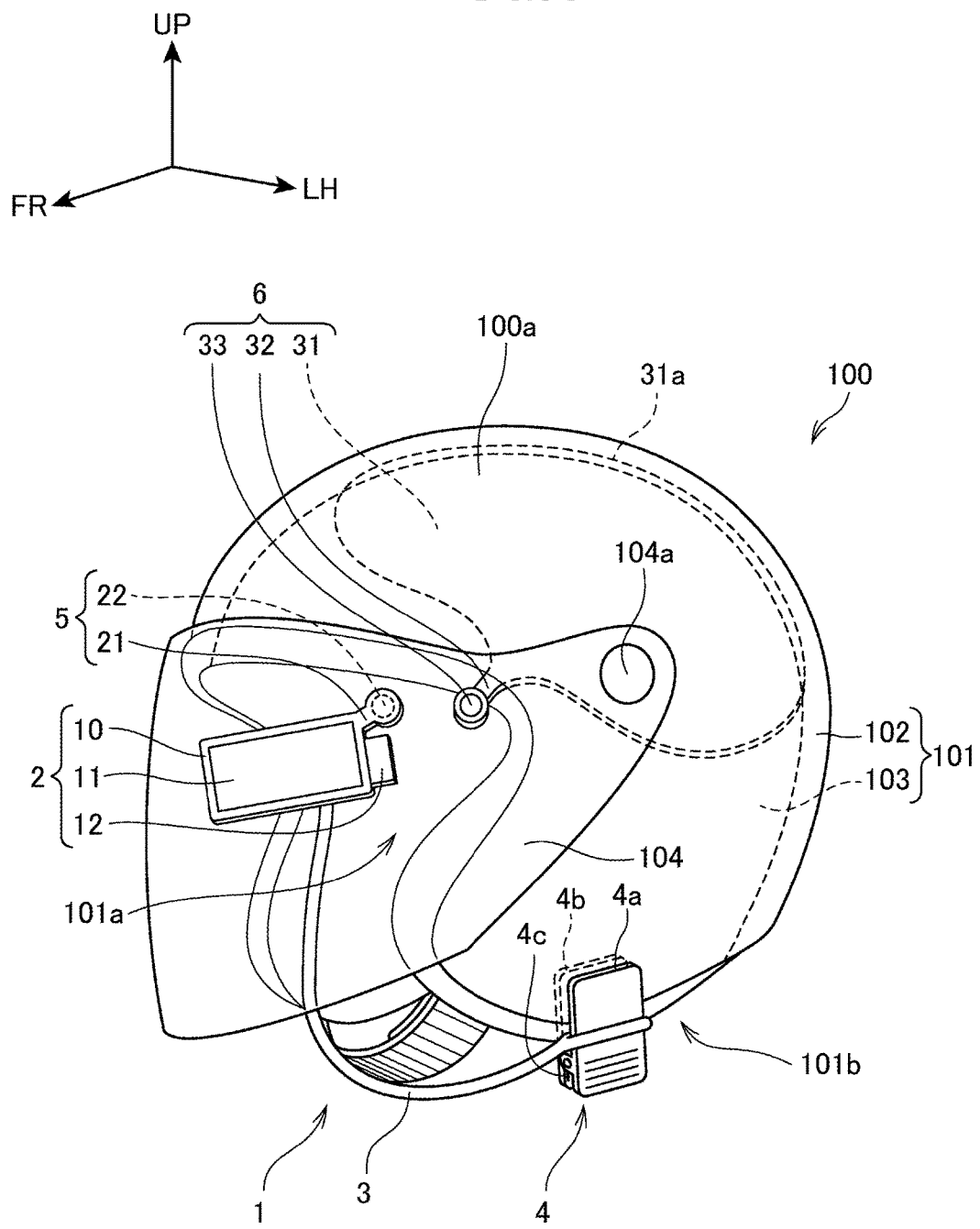
FIG. 3 is a view illustrating a condition in which a positioner has left the positioning sheet.

The frame 10 includes a positioner 5. The positioner 5 includes a bulge 21 and a magnet 22. The bulge 21 bulges outwardly from the frame 10. The magnet 22 is fixed and supported at a distal end of the bulge 21. The magnet 22 is attracted and fixed by a magnet 33 of a positioning sheet (positioned portion) 6. The positioning sheet 6 includes, as depicted in FIG. 2B, a sheet-shaped fixing portion 31, a protrusion 32, and the magnet 33. The fixing portion 31 has a substantially circular shape with an enlarged diameter. The protrusion 32 protrudes to extend from an outer edge of the fixing portion 31. The magnet 33 is fixed and supported at a distal end of the protrusion 32. As depicted in FIG. 3, the fixing portion 31 is disposed to expand between the helmet shell 102 and the inner part 103. The protrusion 32 is disposed to be exposed anteriorly from a space between the helmet shell 102 and the inner part 103. The fixing portion 31 has an enlarged diameter and a large frictional resistance surface. A friction force received by the fixing portion 31 from the helmet shell 102 and the inner part 103 causes the positioning sheet 6 to be fixed in a condition of being inserted inside the helmet main unit 101. The sheet-shaped fixing portion 31, under a condition of being sandwiched between the helmet shell 102 and the inner part 103, has a rear end 31a reaching a point near a head top portion 100a of the helmet 100 and, preferably, extending beyond the head top portion 100a of the helmet 100. Moving the inner part 103 away from the helmet shell 102 allows the fixing portion 31 to be moved. The position of the positioning sheet 6 can be adjusted freely with respect to the helmet 100.

When, from the condition depicted in FIG. 3, the magnet 22 of the positioner 5 is attracted by the magnet 33 of the protrusion 32 disposed anterior to the helmet 100 as depicted in FIG. 1, the monitor 2 is positioned correctly with respect to the helmet 100. Resisting an attraction force between the magnets 22 and 33 allows the positioner 5 to be removed from the positioning sheet 6, so that the positioner 5 can be removed from the positioning sheet 6.

In the head-mounted display 1 according to the present embodiment, causing the clip 4 to pinch the helmet shell 102 allows the head-mounted display 1 to be mounted on the helmet 100. The user wears the helmet 100 and then flexes to adjust the position of the flexible hose 3 extending from the clip 4. These steps allow the monitor 2 to be disposed at a position before the eyes of the user. The user can thereby operate the saddle riding vehicle, while watching information, such as navigation, displayed on the monitor 2.

The head-mounted display 1 in the present embodiment can be mounted by simply pinching the neck base 101b of the helmet 100 with the clip 4 and is thus mountable on the helmet 100 that can take various shapes. The mounting position of the head-mounted display 1 with respect to the helmet 100 can be freely adjusted by simply changing the position at which the neck base 101b is to be pinched. Furthermore, the head-mounted display 1 is configured so as to be mounted via the clip 4 and is thus readily mountable and removable with respect to the neck base 101b of the helmet 100. The monitor 2, because being mounted by way of the flexible hose 3, can be disposed at any position. The monitor 2 can thus be disposed at an optimum position within the field of view regardless of differences in the physique (e.g., size and shape of the face) and in an operating position for operating the saddle riding vehicle. In addition, when the user attempts to remove the helmet 100, he or she displaces the monitor 2 laterally outwardly from an opening 101a in the helmet main unit 101. This makes removal of the user's helmet 100 easy without allowing the monitor 2 to be a hindrance.

The clip 4 is configured so as to be removable with respect to the helmet shell 102. The clip 4 thus can be mounted and removed from the outside of the helmet 100, so that mounting of the helmet 100 on the head-mounted display 1 and removal of the helmet 100 from the head-mounted display 1 can be performed easily. Additionally, as depicted in FIG. 1, the monitor 2 can be disposed inside a shield 104 of the helmet 100 by adjusting the position of the flexible hose 3. The shield 104 is a shield covering at least eyes of the user and is connected with the helmet shell 102 of the helmet 100 via a hinge 104a. The monitor 2, because being disposed inside the shield 104 of the helmet 100, can be protected by the shield 104 from air and obstacles.

In the head-mounted display 1 in the present embodiment, the monitor 2 can be disposed inside the shield 104. This arrangement allows a clearance between the shield 104 and the helmet main unit 101 to be narrowed and the function of the shield 104 is not likely to be impaired.

The head-mounted display 1 in the present embodiment includes the positioner 5 and the positioning sheet 6 and the positioning sheet 6 is fixed to the helmet 100 at a freely adjustable position. Thus, by adjusting the position of the protrusion 32 of the positioning sheet 6 to correspond to the physique of the user in advance, the monitor 2, when attempted to be positioned, can be more easily brought into a position optimum for the user. In addition, the monitor 2 is positioned at the helmet 100 through the positioner 5 and the positioning sheet 6. As compared with an arrangement in which the monitor 2 is supported only by the flexible hose 3, the monitor 2 can be prevented from being oscillated with respect to the helmet main unit 101 even with excessive vibrations, for example, under bad road conditions or in bad weather, or when the user shakes his or her head. The monitor 2 can thus be made more easily viewable. Additionally, the positioning sheet 6 is fixed to the helmet main unit 101. Because the monitor 2 is positioned at the helmet main unit 101 instead of the shield 104, the monitor 2 only can be left to stay within the field of view even when the shield 104 is rotated to swing up about the hinge 104a.

The positioning sheet 6 is inserted and fixed between the helmet shell 102 and the inner part 103. The positioning sheet 6 can be fixed to the helmet main unit 101 through a simple structure.

The positioning sheet 6 includes the fixing portion 31 having a diameter enlarged inside the helmet 100. The positioning sheet 6 can be fixed inside the helmet 100 by the increased frictional resistance surface with respect to the helmet shell 102 and the inner part 103, while having a compactly built protrusion 32 that protrudes to the outside of the helmet 100.

Additionally, the positioner 5 of the monitor 2 can be mounted on, and removed from, the positioning sheet 6. Thus, when navigation or other display is not necessary, the monitor 2 can be removed from the positioning sheet 6 and displaced by flexing the flexible hose 3. The monitor 2 can thus be easily displaced to a position outside the field of view even with the head-mounted display 1 left attached to the helmet 100. Moreover, the monitor 2 is positioned at the helmet main unit 101 instead of the shield 104 and, with the shield 104 in a lowered position, the positioner 5 can be removed from the positioning sheet 6 to thereby displace the monitor 2 to a position outside the field of view.

The embodiment described above is illustrative only and not limiting and can be modified or applied freely within the spirit and scope of the invention.

The monitor 2 has been described to include the transmission-type liquid crystal display 11. A display configuration is nonetheless possible, in which, for example, a half mirror reflects a projected image and a real image anterior to the half mirror is transmitted to the field of view.

The processor 12 including a battery and a processing unit has been described to be integrated, together with the liquid crystal display 11, with the frame 10. The processor 12 may nonetheless be separated from the monitor 2. For example, an arrangement may be made to allow a cable to be disposed inside the flexible hose 3 and the cable inside the flexible hose 3 electrically connects the liquid crystal display 11 with an external processor 12 disposed on the clip 4 side.

Additionally, preferably, the clip 4 pinches the helmet 100 on the helmet shell 102 as a hat body from a steadiness viewpoint. The clip 4 may nonetheless pinch the helmet 100 on the inner part 103. Alternatively, the clip 4 may pinch the helmet 100 on both the helmet shell 102 and the inner part 103.

The positioning sheet 6 has been described to be fixed inside the helmet 100 by the fixing portion 31 having an enlarged diameter. The positioning sheet 6 may nonetheless be fixed inside the helmet 100 by a clip instead of the fixing portion 31.

Additionally, the clip 4 has been described to include the torsion spring 4c. A configuration is still possible, in which the clip plates 4a and 4b removably pinch the helmet 100 using a wing nut and a bolt instead of the torsion spring 4c.

DESCRIPTION OF REFERENCE SYMBOLS

2 Display
3 Connector
4 Mounting portion
5 Positioner
6 Positioned portion
11 Liquid crystal display
100 Helmet
102 Helmet shell
103 Inner part
104 Shield

The invention claimed is:
1. A head-mounted display comprising: a mounting portion that can be removed from a helmet; a connector connected with the mounting portion and allowing a position to be freely adjusted; a display disposed at a distal end of the connector; a positioner included in the display; a positioned portion at which the positioner is positioned, and being fixed to the helmet such that the position of the positioned portion can be freely adjusted.

2. The head-mounted display according to claim 1, wherein the positioned portion is inserted and fixed in position between a helmet shell and an inner part.

3. The head-mounted display according to claim 1, wherein the positioned portion includes a fixing portion having a diameter enlarged inside the helmet.

4. The head-mounted display according to claim 1, wherein the positioner can be mounted on, and removed from, the positioned portion.

5. The head-mounted display according to claim 1, wherein the display includes a flat plate-shaped liquid crystal display.

6. The head-mounted display according to claim 1, wherein the display is provided so as to be disposed inside a shield of the helmet.

7. The head-mounted display according to claim 1, wherein the mounting portion is removably disposed at the helmet shell of the helmet.

\* \* \* \* \*